US 6,494,281 B1

(12) United States Patent
Faye et al.

(10) Patent No.: US 6,494,281 B1
(45) Date of Patent: Dec. 17, 2002

(54) METHOD AND DEVICE FOR STABILIZING A VEHICLE

(75) Inventors: Ian Faye, Stuttgart (DE); Klaus-Dieter Leimbach, Moeglingen (DE); Gabriel Wetzel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,521

(22) PCT Filed: Feb. 23, 1999

(86) PCT No.: PCT/DE99/00482

§ 371 (c)(1),
(2), (4) Date: Mar. 6, 2000

(87) PCT Pub. No.: WO99/51475

PCT Pub. Date: Oct. 14, 1999

(30) Foreign Application Priority Data

Apr. 7, 1998 (DE) .......................... 198 15 497

(51) Int. Cl.$^7$ ........................ B60K 27/02; G06F 17/00
(52) U.S. Cl. ........................................ 180/197; 701/1
(58) Field of Search ................... 180/282, 197, 180/271, 170; 701/69, 70, 71, 82; 364/426.02, 426.03; 303/7, 140, 146, 125

(56) References Cited

U.S. PATENT DOCUMENTS

| | | | | |
|---|---|---|---|---|
| 4,976,330 A | * | 12/1990 | Matsumoto | 180/197 |
| 5,400,251 A | * | 3/1995 | Ishiguro et al. | 364/426.02 |
| 5,700,073 A | * | 12/1997 | Hiwatashi et al. | 303/146 |
| 5,734,595 A | * | 3/1998 | Matsuno | 364/431.052 |
| 5,782,543 A | * | 7/1998 | Monzaki et al. | 303/146 |
| 5,825,284 A | * | 10/1998 | Dunwoody et al. | 340/440 |
| 5,869,943 A | * | 2/1999 | Nakashima et al. | 318/586 |
| 6,038,495 A | * | 3/2000 | Schiffmann | 701/1 |
| 6,076,027 A | * | 6/2000 | Raad et al. | 701/38 |
| 6,175,790 B1 | * | 1/2001 | Lin et al. | 701/36 |
| 6,192,305 B1 | * | 2/2001 | Schiffmann | 701/45 |
| 6,209,972 B1 | * | 4/2001 | Matsuno | 303/146 |
| 6,216,079 B1 | * | 4/2001 | Matsuda | 701/70 |

FOREIGN PATENT DOCUMENTS

| | | |
|---|---|---|
| DE | 1 902 944 | 8/1970 |
| DE | 35 45 715 | 7/1987 |
| DE | 196 02 879 | 8/1997 |
| EP | 0 321 894 | 6/1989 |
| EP | 0 758 601 | 2/1997 |
| EP | 0 807 562 | 11/1997 |

OTHER PUBLICATIONS

FDR—Die Fahrdynamikregelund von Bosch, ATZ, vol. 96, No. 11, 1994, pp. 674–689.

* cited by examiner

Primary Examiner—Brian L. Johnson
Assistant Examiner—G. B. Klebe
(74) Attorney, Agent, or Firm—Kenyon & Kenyon

(57) ABSTRACT

A method of stabilizing a motor vehicle, preferably to prevent a vehicle from rolling over about a vehicle axis oriented in a longitudinal direction of the vehicle. To do so, a quantity describing the transverse dynamics of the vehicle is determined. This quantity is compared with at least one characteristic value, in particular a threshold value, for this quantity. For the case when the quantity describing the transverse dynamics of the vehicle is greater than or equal to the characteristic value, a speed of the vehicle is reduced to or maintained at a preselectable speed value at least by braking measures on at least one wheel and/or by engine measures and/or by retarder measures (SR).

16 Claims, 3 Drawing Sheets

US 6,494,281 B1

METHOD AND DEVICE FOR STABILIZING A VEHICLE

FIELD OF THE INVENTION

The present invention relates to a method and a device for stabilizing a motor vehicle.

BACKGROUND INFORMATION

German Published Patent Application No. 19 02 944 describes a device for preventing vehicles from skidding. The device contains measurement instruments for determining the instantaneous vehicle condition, connected to a control unit that responds to certain limit values of the vehicle. The device also includes means that can be switched on for automatic control of at least one device for keeping the vehicle on track, triggered by the control unit on reaching a predetermined limit value for the transverse acceleration. If a maximum possible transverse acceleration for a vehicle design is detected, the program for the control unit is set at a lower value. This means that the brakes are activated regardless of the driver's reaction even below the critical threshold value, i.e., before the vehicle is oversteered, and the power regulating element of the machine is reset at a lower driving power.

German Published Patent Application No. 35 45 715 describes a device for regulating the drive of motor vehicles in the sense of maintaining stable driving conditions. This device includes a computing unit for determining a setpoint and a tolerance range for the rpm difference of the front wheels or the transverse acceleration or the yaw rate and a comparison unit, when this setpoint or tolerance range is compared with the actual value measured. The difference between the actual value and the setpoint or tolerance range serves as a control signal for the brakes of the wheels and/or for a power controlling element of the vehicle's engine.

With the devices described above, the brakes of the wheels and/or a power controlling element for the engine are driven as a function of a comparison between an actual value of a quantity describing the transverse dynamics of the vehicle and a respective limit value so that the vehicle is stabilized on the basis of the reduction in vehicle speed. The vehicle speed resulting from the interventions in the brakes and/or the engine is not preset here.

The object of the present invention is to improve upon existing devices and methods for stabilizing motor vehicles to the extent that on the basis of the vehicle speed a defined condition is established for the vehicle for the case when a quantity describing the transverse dynamics of the vehicle is greater than or equal to a characteristic value for the quantity describing the transverse dynamics of the vehicle.

SUMMARY OF THE INVENTION

The method according to the present invention for stabilizing a motor vehicle is used in particular to prevent a vehicle from rolling over about a vehicle axis oriented in the longitudinal direction of the vehicle. To do so, a quantity describing the transverse dynamics of the vehicle is determined and is compared with at least one characteristic value, in particular a threshold value, for the quantity describing the transverse dynamics of the vehicle. For the case when the quantity describing the transverse dynamics of the vehicle is greater than or equal to the characteristic value, braking measures at least are implemented on at least one wheel and/or engine measures and/or retarder measures are implemented. These braking measures and/or engine measures and/or retarder measures are advantageously implemented in such a way that the speed of the vehicle is reduced to a preselectable speed value or is kept at a preselectable speed value.

Due to the fact that the speed of the vehicle is reduced to or kept at a preselectable speed value by the braking measures and/or by the engine measures and/or by the retarder measures, a defined condition is established for the vehicle in situations that are critical from the standpoint of transverse dynamics. For example, this defined condition may correspond to turning a curve at a maximum possible curve speed. In this case, the preselectable speed value corresponds to the maximum possible curve speed.

The speed of the vehicle is referred to below as the vehicle speed. At this point, the phrase "a vehicle axis oriented in the longitudinal direction of the vehicle" should be explained. First, the vehicle axis about which there is a tendency of the vehicle to roll may be the actual longitudinal axis of the vehicle. Second, it may be a vehicle axis which is twisted by a certain angle with respect to the actual longitudinal axis of the vehicle. It does not matter here whether or not the twisted vehicle axis passes through the center of gravity of the vehicle. The case of the twisted vehicle axis should also allow an orientation of the vehicle axis at which the vehicle axis corresponds to either a diagonal axis of the vehicle or to an axis parallel to the diagonal axis.

The value of the quantity describing the transverse dynamics of the vehicle, which is allowed for the vehicle without the vehicle becoming unstable on reaching this value, is used to advantage for the characteristic value. The term unstable is understood here to refer to the onset of skidding or rolling of the vehicle.

The characteristic value is either a fixedly predetermined value or a value determined for the respective driving condition of the vehicle. The fixedly predetermined value is determined in advance by driving trials, for example, and the resulting vehicle performance, and is supported by simulations. It is assumed that at this characteristic value the vehicle performance is stable in corresponding operating states where this value is reached. Or the characteristic value is determined for the respective vehicle condition. In other words, the characteristic value is determined during driving operation of the vehicle on the basis of the quantities determined for this driving operation.

The characteristic value is advantageously determined at least as a function of a quantity describing the wheel load of at least one wheel. A quantity describing the contact force of the respective wheel is used to advantage as the quantity describing the wheel load of the minimum of one wheel. This quantity is normally available in traction control systems.

Two alternative methods are available for determining the characteristic value. First, the characteristic value is determined as a function of the wheel load of at least one inside wheel in turning a corner and the quantity describing the transverse dynamics of the vehicle. If, as mentioned previously, the contact force of the respective wheel is used as the quantity describing the wheel load, a linear relationship between the quantity describing the transverse dynamics of the vehicle and the contact force is approximated to determine the characteristic value. The characteristic value is then obtained by interpolation, i.e., the characteristic-value corresponds to the value of the quantity describing the transverse dynamics of the vehicle at which the contact force is zero.

This procedure makes use of the fact that the instability of a motor vehicle is manifested first in wheel performance in situations that are critical from the standpoint of transverse dynamics. In other words, this type of determination yields a prompt and accurate measure of the maximum allowed transverse dynamics of a vehicle in the relevant situation. In situations that are critical from the standpoint of transverse dynamics, an imminent instability is manifested first on the inside wheels of the vehicle in turning a corner, so the characteristic value is advantageously determined as a function of a quantity describing the wheel load of an inside wheel in turning a corner.

In the second alternative, a quantity describing the mass of the vehicle is determined as a function of the quantities describing the wheel loads. Then the characteristic value is read out of an engine characteristics map with the help of the quantity describing the mass of the vehicle. The individual values of the engine characteristics map can also be determined in advance by driving tests supported by simulations. Therefore, the vehicle mass is used as a parameter because the vehicle mass influences the height of the center of gravity of the vehicle, which in turn influences the roll-over behavior of the vehicle and thus the maximum allowed transverse acceleration in turning a corner.

The two procedures mentioned have the advantage that in any situation that is critical for the transverse dynamics (in particular turning a corner at a high speed) the maximum allowed value prevails for the quantity describing the transverse dynamics of the vehicle, and thus the vehicle can be stabilized optimally by braking measures and/or engine measures and/or retarder measures corresponding to the respective driving situation.

As indicated by the preceding discussion, the characteristic value has the function of a limit value.

As part of the targeted reduction in vehicle speed mentioned above, the predetermined speed value is a fixedly preselected value, which was determined in advance by a method similar to that used to determine the characteristic value for the quantity describing the transverse dynamics of the vehicle on the basis of driving tests and with the help of simulations. Or the preselectable speed value is determined like the characteristic value with the help of an engine characteristics map. Or the preselectable speed value is determined during operation of the vehicle at least as a function of the characteristic value and/or a quantity describing the yaw rate of the vehicle. The two latter procedures have the advantage that in any situation that is critical from the standpoint of transverse dynamics, the maximum allowed value for the vehicle speed prevails, and thus the vehicle can be stabilized optimally by braking measures and/or engine measures and/or retarder measures corresponding to the given driving situation. In addition, in this way a speed value representing the maximum allowed driving speed in the corresponding driving situation, which is critical from the standpoint of transverse dynamics, is determined. This yields the additional advantage that the vehicle is not braked to an unnecessary extent. The vehicle can be driven at the maximum possible speed, and traffic flow is largely maintained.

At this point, the facts should be summarized again. The reduction in vehicle speed is initiated by observation of the transverse dynamics of the vehicle. The speed of the vehicle is reduced to a value that is determined by the transverse dynamics of the vehicle. Either this value is determined while the vehicle is being driven or it may be a predetermined value. In either case, it may be based on driving tests and/or simulations conducted in advance.

The braking measures and/or engine measures and/or retarder measures are preferably continued as long as the preselectable speed value is less than a quantity describing the vehicle speed.

A quantity describing the transverse acceleration of the vehicle is used as the quantity describing the transverse dynamics of the vehicle. However, in the method according to the present invention, the quantity describing the transverse dynamics of the vehicle is not measured directly with the help of a corresponding sensor means. Instead, it is determined at least as a function of a quantity describing the vehicle speed. Furthermore, the quantity describing the transverse dynamics of the vehicle is determined as a function of a quantity describing the yaw rate of the vehicle, with the quantity describing the yaw rate of the vehicle in turn being determined at least as a function of the quantity describing the vehicle speed and a quantity describing the steering angle of the vehicle. In other words, ultimately the quantity describing the transverse acceleration of the vehicle is determined as a function of the vehicle speed and the steering angle.

This procedure in determining the quantity describing the transverse acceleration is associated with a definite time advantage with regard to supplying the signal for this quantity. This can be explained as follows. Normally, turning a corner is initiated by setting a steering angle. A corresponding transverse acceleration results from this cornering. If this resulting transverse acceleration is detected with the help of a transverse acceleration sensor, a considerable amount of time elapses between the setting of the steering angle and supplying of the transverse acceleration signal by the transverse acceleration sensor. This is due, inter alia, to the time sequence between the setting of the steering angle and the resulting reduction in the transverse acceleration and also due to the inertia of the transverse acceleration sensor. This time lag is largely eliminated by the procedure described above in determination of the quantity describing the transverse acceleration, in other words, immediately after the steering angle has been set, the prevailing value of the transverse acceleration is the value established in the resulting steady state of the vehicle on the basis of the steering angle set. Since the device and the method according to the present invention prevent roll-over of the vehicle about a vehicle axis oriented in the longitudinal direction of the vehicle, the procedure described above is possible in determining the quantity describing the transverse dynamics of the vehicle, i.e., the quantity describing the transverse acceleration, because roll-over of a vehicle usually occurs when turning a corner, and cornering is performed on the basis of a steering angle selected by the driver of the vehicle.

In summary, it can be concluded that the quantity describing the transverse dynamics of the vehicle and/or the quantity describing the yaw rate of the vehicle is advantageously determined with the help of simple mathematical models describing a steady state of the vehicle. This yields the time characteristic described above.

Due to the braking measures described above, all the wheels of the vehicle are advantageously braked uniformly. Uniform braking should be understood to mean that different braking forces are not intentionally set from the beginning. As an alternative to or in support of these braking measures, the moment delivered by the engine is reduced through appropriate engine measures. The vehicle speed is reduced or kept at a preselectable speed value as a result of these two measures. It is also possible to implement such braking measures where at least the rear inside wheel in turning is braked less than the other wheels of the vehicle and/or not at all. With these types of braking measures, a temporary increase in yaw rate during the braking measure and thus a resulting unstable state are prevented.

If the latter types of braking measures are selected, then advantageously all steps between a normal braking measure and no braking measure are possible on the rear inside wheel in turning. The step at which the rear inside wheel in turning is to be braked can be determined as a function of a quantity describing the transverse dynamics of the vehicle, for example.

As an alternative to the procedure described previously, the characteristic value is reduced by a small value. The quantity describing the transverse dynamics of the vehicle is compared with the reduced characteristic value. For the case when the quantity describing the transverse dynamics of the vehicle is greater than the reduced characteristic value, the speed of the vehicle is reduced to a preselectable speed value at least by braking measures on at least one wheel and/or by engine measures and/or by retarder measures. As a result of this procedure, the vehicle speed is reduced not when the characteristic value has been reached but at a slightly earlier point in time, namely when the vehicle approaches a driving condition which is critical from the standpoint of transverse dynamics as described by the characteristic value.

DETAILED DESCRIPTION

Figure 1A:
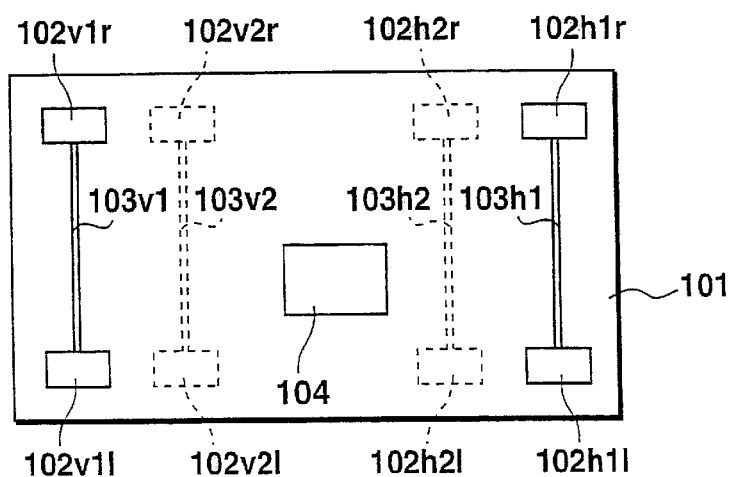
FIG. 1a shows a first road vehicle in which a method according to the present invention is used.
Figure 1B:
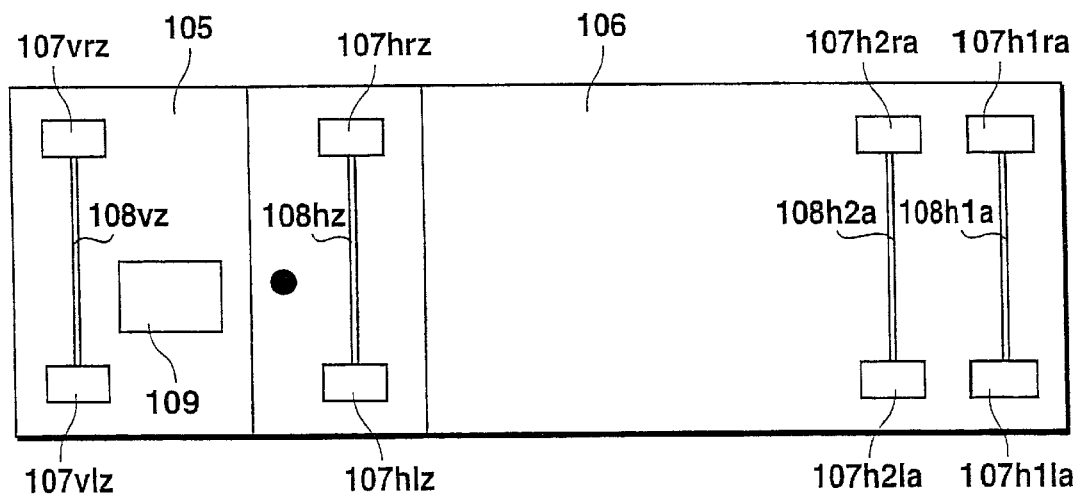
FIG. 1b shows a second road vehicle in which a method according to the present invention is used.

First, FIGS. 1a and 1b shall be discussed; they show different road vehicles in which the method according to the present invention can be used.

FIG. 1a shows a one-part vehicle 101. This vehicle may be a passenger vehicle or a commercial vehicle. This vehicle should have at least two wheel axles, as indicated by dotted lines. The wheel axles of vehicle 101 are labeled as 103$ix$. Index i indicates whether it is a front axle (v) or a rear axle (h). In vehicles with more than two wheel axles, index x indicates which of the front or rear axles is involved. The following assignment is used. The front axle or rear axle closest to the front or rear of the vehicle is assigned an index x with the smallest value. The farther the respective wheel axle from the front or rear of the vehicle, the greater is the value of respective index x. Wheels 102$ixj$ are assigned to wheel axles 103$ix$. The meaning of indices i and x corresponds to that described above. Index j indicates whether the wheel is on the right (r) or left (l) side of the vehicle. In the illustration of wheels 102$ixj$, no differentiation has been made between single wheels and dual wheels. Furthermore, vehicle 101 has a control unit 104 in which the device according to the present invention is implemented for carrying out the method according to the present invention.

FIG. 1b shows a vehicle combination with a traction machine 105 and a trailer 106. The diagram given here is not intended to restrict the scope in any way; a vehicle combination with a traction machine and a draw-bar trailer would also be conceivable. Traction machine 105 should have wheel axles 108$iz$. Wheels 107$ijz$ are provided for wheel axles 108$iz$. The meaning of indices i and j corresponds to that described above. Index z indicates the wheel axles or wheels of the traction machine. Furthermore, traction machine 105 has a control unit 109 in which the method according to the present invention is running and with which both traction machine 105 and trailer 106 are stabilized. Trailer 106 should have two wheel axles 108$ixa$. Similarly, wheels 107$ixja$ are assigned to two wheel axles 108$ixa$. Index a indicates that these are components of trailer 106. The number of wheel axles for traction machine 105 or for trailer 106 shown in FIG. 1b should not restrict the scope in any way. Control unit 109 may also be arranged in trailer 106 instead of being in traction machine 105. Furthermore, it is also conceivable to equip both traction vehicle 105 and trailer 106 with one control unit each.

The labeling by indices a, i, j, x and z used in FIGS. 1a and 1b is the same for all quantities or components for which it is used.

Figure 2:
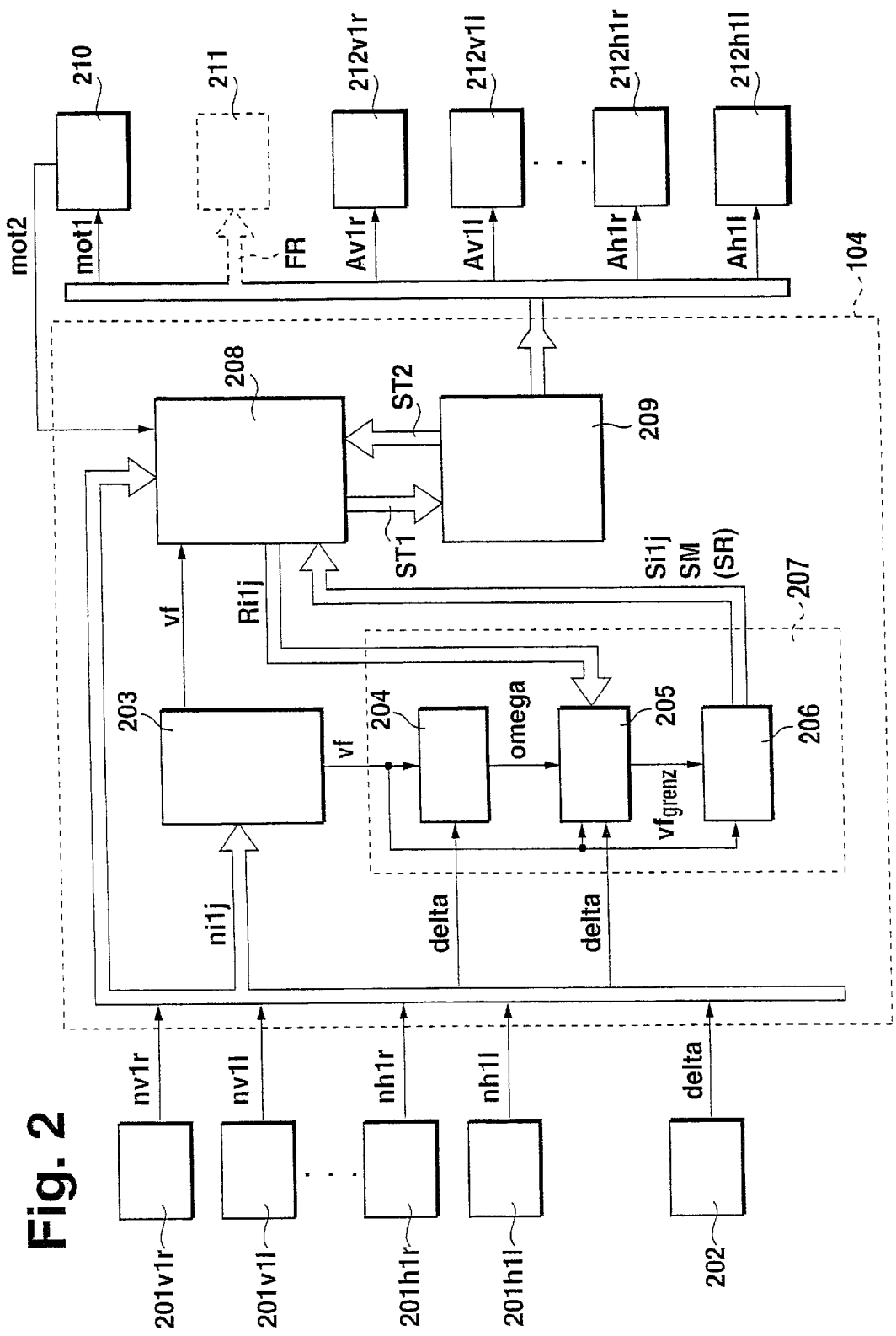
FIG. 2 shows a survey diagram of a device according to the present invention for carrying out a method according to the present invention.

FIG. 2 is based on a one-part vehicle, as illustrated in FIG. 1a, for example. For this reason, control unit 104 is included in FIG. 2. However, this diagram is not at all restrictive, because the object of the present invention can also be applied accordingly to a vehicle such as that illustrated in FIG. 1b. Any corresponding modifications are required here, based on FIG. 2.

It should be assumed that the one-part vehicle has at least two wheel axles 103$ix$, a front axle 103$vl$ with wheels 102$vlr$ and 102$vll$ as well as a rear axle 103$hl$ with wheels 102$hlr$ and 102$hll$. Wheel rpm sensors 201$ilj$ belonging to these wheels are shown in FIG. 2. Additional wheel rpm sensors 201$ixj$ are added, as indicated in FIG. 2, depending on the number of wheel axles of the one-part vehicle. Quantities nilj, each describing the wheel rpm of corresponding wheel 102$ilj$, are determined with wheel rpm sensors 201$ilj$. Quantities nilj are sent to blocks 203 and 208. Wheel rpm sensors 201$ilj$ are present in any case, regardless of the type of controller 209.

The choice of a single-axle vehicle in this embodiment is not intended to restrict the scope of the present invention in any way, because it can also be used for multiaxial vehicles (then index x has a value different from 1) or for vehicle trains.

Furthermore, the vehicle has a sensor 202 with which a quantity delta that describes the steering angle is determined. This quantity delta is sent to blocks 204, 205 and 208.

A quantity vf describing the speed of the vehicle is determined in block 203 in a conventional manner from wheel rpm values nilj and is sent to blocks 204, 205, 206 and 208.

A quantity omega describing the yaw rate of the vehicle is determined in block 204 on the basis of quantities vf and delta sent to it. Quantity omega is determined with the help of a simple mathematical model into which quantities vf and delta are entered. This mathematical model is described, for example, by the equation:

$$omega = \frac{vf}{1 + EG \cdot vf^2} \cdot delta \qquad (1)$$

The value of the yaw rate of the vehicle for a steady state of the vehicle, such as that established by selection of the steering angle, can be determined with the help of this mathematical model. In equation (1), quantity 1 describes the wheel base of the vehicle, quantity EG describes the self-steering gradient of the vehicle, a quantity characteristic for the respective vehicle. Quantity omega is sent from block 204 to block 205.

Quantities processed internally in block 205 and quantities determined externally, i.e., processed in other blocks, are determined in block 205. A quantity aq describing the transverse dynamics of the vehicle and a characteristic value aqgrenz for this quantity describing the transverse dynamics of the vehicle are determined as internal quantities in block 205. Optionally a quantity describing the mass of the vehicle is also determined in block 205. A preselectable speed value vfgrenz is determined as an external quantity in block 206 and sent to block 206.

A quantity aq describing the transverse acceleration of the vehicle is used as the quantity describing the transverse dynamics of the vehicle. Quantity aq is determined as a function of quantities vf and omega sent to block 205 by using the following equation, for example:

$$aq = vf \cdot omega \qquad (2)$$

This equation also describes a steady state of the vehicle.

If equation (1) is inserted into equation (2), it can be seen that the quantity describing the transverse dynamics of the vehicle is obtained at least as a function of vehicle speed vf and steering angle quantity delta.

Characteristic value aqgrenz is determined at least as a function of a quantity describing the wheel load of at least one wheel. To do so, quantities Rilj, describing the wheel load of the individual wheels, are sent to block 205 from block 208. For example, the contact force or normal force prevailing at each wheel is used as quantities Rilj. These forces are determined in block 208 at least as a function of wheel rpm values nilj in a conventional manner.

The characteristic quantity may be determined as a function of the wheel load of at least one inside wheel in turning a corner and the quantity describing the transverse dynamics of the vehicle. To do so, first the inside wheels in turning a corner are determined in block 205, e.g., as a function of quantity delta supplied to it. A linear relationship for quantity Rilj as a function of the quantity describing the transverse acceleration is approximated as a function of the quantity describing the transverse dynamics of the vehicle, i.e., the quantity describing the transverse acceleration of the vehicle, and one of quantities Rilj of an inside wheel in turning a corner. With the help of this linear relationship, the characteristic value is determined by interpolation. The interpolation is based on the fact that the characteristic value prevails when quantity Rilj is close to the value zero or assumes this value as an alternative.

As an alternative, characteristic value aqgrenz can be read out of an engine characteristics map as a function of a quantity describing the mass of the vehicle. To do so, in block 205 a quantity describing the mass of the vehicle is determined first as a function of the quantities describing the wheel loads. As an alternative to the determination of the vehicle mass from the quantities describing the wheel loads, the vehicle mass may also be determined on the basis of engine data. Or the characteristic value may be a fixedly predetermined value which is stored in block 205.

Preselectable speed value vfgrenz is determined as a function of characteristic value aqgrenz and quantity omega describing the yaw rate using the equation:

$$vfgrenz = \left(\frac{aggrenz}{omega}\right) \qquad (3)$$

This speed value vfgrenz represents the speed that can still be driven in the driving situation described by characteristic value aqgrenz without the vehicle becoming unstable. As an alternative, a fixedly predetermined value, which is stored in block 205, may be used for the preselectable speed value. Or the preselectable speed value is determined with the help of an engine characteristics map. Speed value vfgrenz is sent from block 205 to block 206.

Vehicle speed vf is compared with preselectable speed value vfgrenz in block 206. As long as the preselectable speed value is lower than quantity vf describing the vehicle speed, braking measures and/or engine measures and/or retarder measures are implemented to reduce the vehicle speed to the preselectable speed value or to keep it at the preselectable speed value. Depending on this comparison, quantities Silj and SM are determined in block 206 to perform the braking measures and/or engine measures. If the vehicle has a retarder (block 211), a quantity SR is determined in block 206 for implementing the retarder measures (optional equipment of the vehicle is indicated by writing quantity SR in parentheses). Quantities Silj and SM or SR (if formed) are sent to block 208. With the help of quantities Silj, controller 208 is notified of which wheels of the vehicle are to be braked to stabilize the vehicle. With the help of quantity SM, controller 208 is notified of the extent to which an engine measure is to be implemented to reduce the moment delivered by the engine. With quantity SR, controller 208 is notified of the extent to which a retarder measure is to be implemented.

It should be pointed out here that the blocks essential to the present invention are combined in block 207 in FIG. 2.

The controller or vehicle controller implemented in control unit 104 is labeled as 208. Controller 208 is generally a traction controller. This traction controller may be designed, for example, as a brake slip controller and/or as a drive slip controller. As an alternative, the traction controller may also be a controller which in its basic function regulates a quantity describing the driving dynamics of the vehicle, e.g., a quantity which depends on the transverse acceleration and/or the yaw rate of the vehicle, by implementing measures in the wheel brakes and/or in the engine. At this point, reference should be made to the publication "FDR—Die Fahrdynamikregelung von Bosch" in Automobiltechnische Zeitschrift (ATZ), vol. 96, No. 11 (1994), pp. 674–689, which describes a system of regulating a quantity describing the driving dynamics of a vehicle. This publication indicates that the control of behavior in the extreme range of vehicle dynamics should influence the vehicle's three horizontal degrees of freedom—longitudinal, transverse, and yaw speed about the vertical axis—to adapt handling to the driver's wishes and to the road. For this purpose, the system must first determine how the driver wants the automobile to behave in an extreme range (desired behavior) and also how the automobile is actually behaving (actual behavior). To reduce the difference between the desired behavior and the actual behavior (the system deviation), the tire forces should be suitably influenced using actuators. The vehicle behavior is considered in the closed-loop control circuit, and the braking and tractive forces on the wheels are adjusted depending on the situation, so that the desired handling may be largely achieved.

The controller may be implemented as a sampling controller in a freely programmable $\mu$C. Referring now to FIG.

4 of the publication, a schematic drawing of the total system concept is shown with the automobile as the controlled system. The sensors 1–5 determine the controller input variables, the actuators 6–7 affect the braking and tractive forces, and the hierarchically structured controller consists of a higher-level vehicle dynamics controller and lower-level slip controllers. The higher-level controller specifies desired values (i.e., desired slip) for the lower-level controller. To determine the desired behavior, the signals communicated from the steering wheel angle sensor 3 (desired steering) the forward pressure sensor 2 (desired deceleration), and the engine management unit 7 (desired torque), which describe the driver's wishes, are evaluated. The calculation of the desired behavior also considers the static coefficients of friction and the vehicle speed, which are estimated from the signals of the wheel speed sensors 1, the transverse acceleration sensor 5, the yaw speed sensor 4 and the pressure sensor 2. The actual behavior of the automobile is primarily determined from the yaw speed signal and the attitude angle estimated in an observer. The vehicle dynamics controller controls the two state variables (yaw speed and attitude angle) and calculates the yawing moment, which is needed to adjust the actual state variables to the desired state variables. To produce this desired yawing moment, the vehicle dynamics controller determines what changes in desired slip may be necessary on the appropriate wheels. These changes are made via the lower-level braking and traction slip controller and the braking hydraulics 6 and engine management 7 actuators. The expanded ABS/ASR hydraulic unit 6 allows active braking of all wheels with high dynamics in the entire range of possible temperatures, maintaining secure separation of the circuits. The engine management unit 7, with a CAN interface, permits the required engine torque to be set and thus the traction slip values on the wheels.

The vehicle dynamics controller adapts handling in the extreme range of vehicle dynamics to the behavior in the normal range. For this purpose, the controller may change the longitudinal forces (and thus indirectly the lateral forces) on each wheel by changing the desired slip. Such changes should be made by the lower-level braking and traction slip controllers and only to the extent required to maintain the handling intended by the automobile manufacturer and to ensure control in the extreme range of vehicle dynamics.

The connection between the steering angle, vehicle speed, and yawing speed in steady-state curve driving forms the basis for the desired vehicle movement, both while driving in steady-state and while braking and/or accelerating. The speed and the steering angle are used to calculate the desired yawing speed using the single-track model.

However, if the static coefficient of friction is less than the transverse acceleration along the desired steady-state track, the desired value may be too great, and it should be reduced by attitude angle control to a value that corresponds to a physically drivable course. No attempt should be made to directly influence the transverse speed and thus also the attitude angle by changing lateral forces. Instead, the transverse motion should be indirectly adjusted through changes in the slip angle, turning the automobile by producing yawing moments.

Referring now to FIG. 5 of the publication, there is seen the structure of the vehicle dynamics controller with the input and output variables and signal flow in a simplified block diagram. The observer receives the measured quantities y δ, $a_y$, and the estimated longitudinal vehicle speed $v_x$ and braking forces $F_B$ to determine the slip angle, the attitude angle α, the transverse speed of the vehicle $v_y$ and the wheel forces in the side and normal direction $F_S$, $F_N$ and the resulting wheel forces $F_R$. The desired values for the attitude angle $β_{So}$, and yawing speed $ψ_{So}$, are determined from the steering wheel angle δ, engine torque $M_{FV}$ (gas pedal position) and braking pressure $P_{Kreis}$ set by the driver, the estimated vehicle speed $v_x$ and the static coefficient of friction μ, which is estimated using the estimated longitudinal and measured transverse acceleration. The automobile's dynamic systems behavior and special situations, such as an inclined road or different static coefficients of friction on the sides of the vehicle (split-friction road), are also considered. The vehicle dynamics controller may include a state controller, and the controlled state variables may include the attitude angle and the yawing speed. The controller considers the attitude angle as it increases. A state controller (Riccati controller design) uses a linearized two-track vehicle model to determine the loop gains of system deviations in attitude angle and yawing speed. The output value of the state controller corresponds to a yawing moment of $M_{CiSo}$. This yawing moment is converted into the desired slip changes on the appropriate wheels, also using the linearized vehicle model and the current slip values λ, the resulting wheel forces $F_R$, and the attitude angles α. For example, if the automobile is oversteered during free rolling in a right curve, and the desired yawing speed is exceeded, then a desired braking slip is set for the left front wheel, which produces a left-rotating change in the yawing moment, decreasing the excessive yawing speed. The changes to the desired slip are implemented by the lower-level ABS or ASR wheel controller. If the brake is not applied or if the driver's forward pressure is not sufficient to adjust the desired slip (partial braking range), the pressure in the braking circuits is actively increased.

It should be pointed out here that only the sensors absolutely necessary for carrying out the method according to the present invention are shown in FIG. 2. Some of these sensors, namely wheel rpm sensors 201ilj, are also necessary in any case for implementation of a traction controller. Depending on which type of traction controller is to be implemented with block 208, additional sensors are optionally necessary. For example, if it is a traction controller for controlling a quantity describing the driving dynamics of a vehicle, then in most cases a steering angle sensor, a transverse acceleration sensor and a yaw rate sensor are required. At this point, reference should be made again to the above-mentioned publication "FDR—The Bosch Method of Regulating Driving Dynamics" which describes such systems in detail. For the case when a transverse acceleration sensor and/or a yaw rate sensor are present, the transverse acceleration and/or yaw rate may also be measured. The measured quantities are then used instead of the calculated quantities. However, the preview function based on the steering angle sensor as described above is no longer guaranteed.

Since block 208 is to be a traction controller, the control taking place there in its basic function is based in a conventional manner on quantities nilj and vf that are supplied to block 208 and are used to determine the slip values prevailing at each wheel. Furthermore, a quantity mot2 which describes the engine rpm of engine 210, for example, and is required in block 208 for implementing the engine measures is sent from engine 210 to block 208. In addition, quantities ST2, which are generated in a block 209 which is the control logic for the actuators present in the vehicle, for the engine and also for the retarder, if any, are sent to block 208. Quantities ST2 inform the controller of which actuators are being controlled at the moment and how they are being controlled, and how the retarder is being controlled. On the basis of these quantities described above, controller 208 determines quantities ST1g, which are sent as quantities ST1 to control logic 209, and as a function of which engine 210 and/or actuators 212ilj are driven to implement the traction control, which is implemented as a basic function in controller 208. In other words, quantities ST1 notify control logic 209 which actuators are to be controlled and how they are to be controlled or how the engine is to be controlled. Reference is made to the above-mentioned publication "FDR—The Bosch Method of Regulating Driving Dynamics" with regard to how quantities ST1g are generated according to the control implemented for the basic function. Regardless of the type of traction control, the control is based on a comparison of actual traction values with preselectable setpoint traction values by a generally conventional method.

In addition to the control implemented in block 208 as the basic function, it also has the function of stabilizing the vehicle and preventing it from rolling over. As part of the roll-over prevention, the controller essentially fulfils two functions. First, it converts quantities Silj and/or SM and/or SR determined in block 206 into corresponding signals ST1u, which are sent as quantities ST1 to control logic 209, and on the basis of which braking moments on the wheels and/or drive moments are generated and/or altered and/or retarder measures are implemented to reduce the vehicle speed to a predetermined speed value or to keep it at a predetermined speed value. Second, block 208 supplies quantities Rilj in the manner described above.

Various procedures are conceivable for the output of quantities ST1g and/or ST1u as quantities ST1. If controller 208 generates only quantities ST1g, output quantities ST1 are identical to these quantities ST1g. If the controller generates quantities ST1g as well as quantities ST1u, then either quantities ST1u can be outputted instead of quantities ST1g or quantities ST1u are superimposed on quantities ST1g.

To stabilize a vehicle which has a tendency to roll over about a vehicle axis oriented in the longitudinal direction of the vehicle with a method according to the present invention or to prevent imminent roll-over of a vehicle, all the wheels of the vehicle are braked uniformly by appropriate braking measures and/or the moment delivered by the engine is reduced by appropriate engine measures and/or a retarder measure is implemented. One alternative to uniform braking of all wheels is to brake all the wheels of the vehicle by corresponding braking measures so that at least the rear wheel on the inside in turning a corner is braked less than the other wheels of the vehicle and/or is not braked at all.

At this point, the term "uniformly" used in conjunction with the braking measure should be explained. The term "uniform braking" should be understood to refer to the fact that the same brake pressure is used for all the wheels. The brake pressure on the wheels can be increased until one wheel approaches the wheel-lock limit. For this wheel, the brake pressure is not increased further. The brake pressure of the other wheels can be increased further. In the alternative braking, another brake pressure, namely a lower brake pressure, is provided from the beginning, at least for the rear inside wheel in turning.

In block 209, the control logic, quantities ST1 generated by controller 208 are converted into control signals for engine 210 and into control signals for the actuators in the vehicle. A brake force can be generated on the corresponding wheels with actuators 212ilj. To control engine 210, the control logic generates a signal mot1 with which the throttle valve setting of the engine, for example, can be influenced. As an alternative, it is also conceivable to influence the quantity of injected fuel supplied to the engine. To control actuators 212ilj, which are designed as brakes in particular, control logic 209 generates signals Ailj with which the brake forces generated by actuators 212ilj on the corresponding wheels can be influenced. Furthermore, control logic 209 generates quantities ST2 mentioned above.

If the vehicle has a retarder 211, the control logic may also generate a signal FR with which the retarder is driven. Furthermore, it is also conceivable for the vehicle to be equipped with chassis actuators to influence the chassis of the vehicle.

The brake system used in FIG. 2 may be a hydraulic, pneumatic, electrohydraulic, or electropneumatic, or electromotor brake system.

Figure 3:
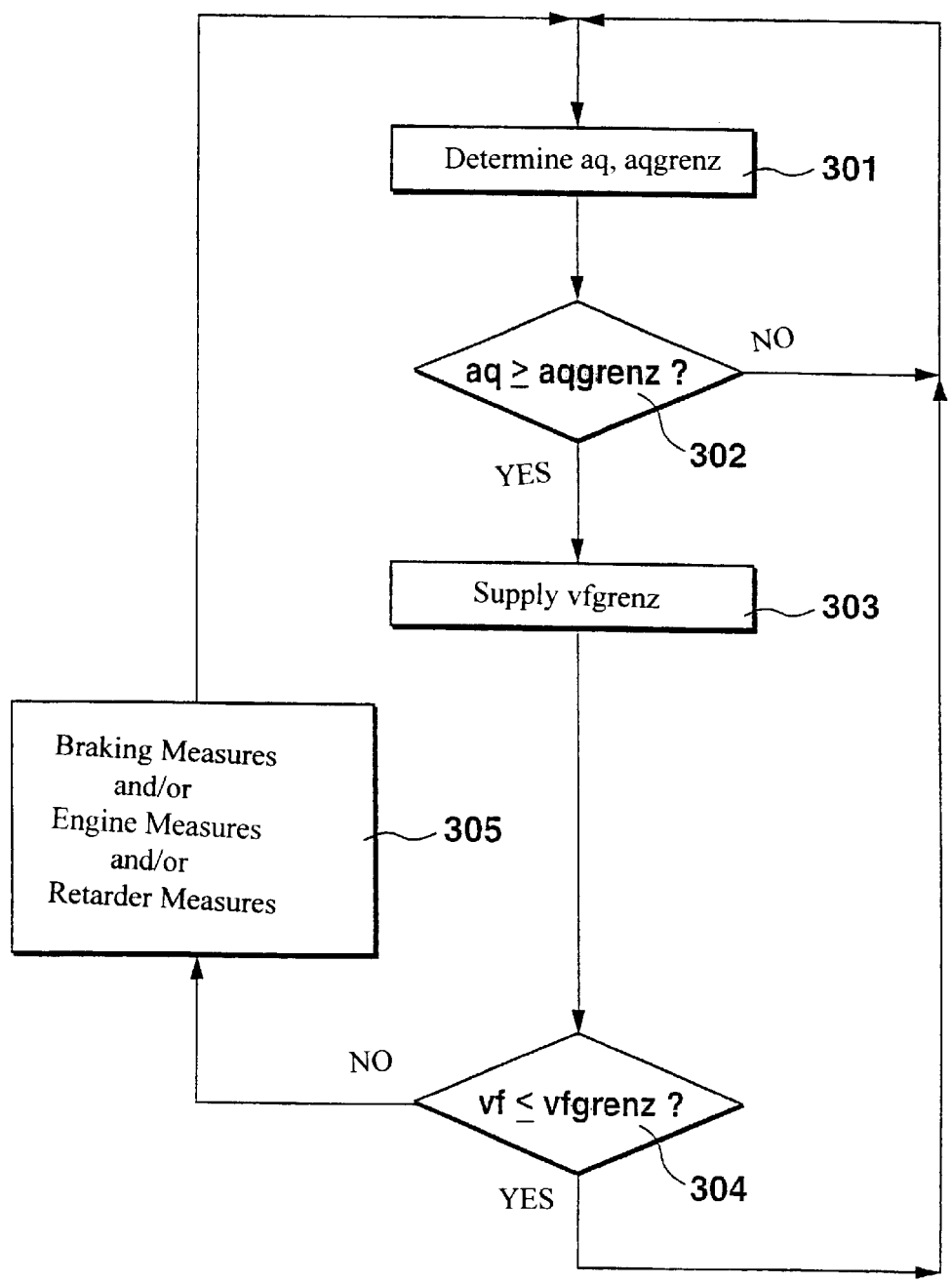
FIG. 3 shows a flow chart illustrating an embodiment for carrying out a method according to the present invention.

FIG. 3 shows a flow chart illustrating the method according to the present invention taking place in the device according to the present invention.

The method according to the present invention begins with a step 301. In this step, quantity aq or aqgrenz is determined. At this point, reference should be made to the description of block 205 in FIG. 2, where these quantities are determined. A step 302 is carried out following step 301. In step 302, quantity aq is compared with characteristic value aqgrenz. If it is found in step 302 that quantity aq is smaller than characteristic value aqgrenz, which is equivalent to the vehicle not being in a driving condition that is critical from the standpoint of transverse dynamics, then step 301 is carried out again following step 302. However, if it is found in step 302 that quantity aq is greater than or equal to quantity aqgrenz, which is equivalent to the vehicle being in a condition that is critical from the standpoint of transverse dynamics, then a step 303 is carried out following step 302.

Quantity vfgrenz is supplied in step 303. At this point, reference should also be made to the description of block 205. A step 304 is carried out after step 303.

In step 304, quantity vf describing the speed of the vehicle is compared with predetermined speed value vfgrenz. If it is found in step 304 that quantity vf is less than or equal to quantity vfgrenz, which is equivalent to the vehicle having a speed at which there is no imminent danger of roll-over, then step 301 is carried out again following step 304. However, if it is found in step 304 that quantity vf is greater than quantity vfgrenz, which is equivalent to the vehicle having a speed at which there is an imminent danger of roll-over, then a step 305 is carried out following step 304.

The braking measures and/or engine measures and/or retarder measures described above are carried out in step 305 to reduce the speed of the vehicle. Signals and/or quantities Silj and/or SM and/or SR generated in block 206 in this regard are not shown in FIG. 3. After step 305, step 301 is carried out again. Since the vehicle is slowed with each braking measure and/or engine measure and/or retarder measure, and thus transverse acceleration aq of the vehicle is reduced, the transverse acceleration is determined again in step 301 and a check is performed in following step 302 to determine whether the vehicle is still in a situation that is critical from the standpoint of transverse dynamics. The vehicle speed is reduced by repeatedly running through steps 301 through 305.

An alternative embodiment could consist of not jumping back to step 301 after step 305 but instead jumping back to step 304. This achieves the result that the vehicle speed is reduced until the query in step 304 is satisfied and thus there is no longer any danger of the vehicle rolling over.

In conclusion, it should be pointed out that the form of the embodiment selected in the description as well as the illustration selected in the figures should not have any restrictive effect on the idea essential to the present invention.

What is claimed is:

1. A method of stabilizing a vehicle to prevent the vehicle from rolling over about a vehicle axis oriented in a longitudinal direction of the vehicle, comprising the steps of:

determining a first quantity describing transverse dynamics of the vehicle, the first quantity being determined at least as a function of a speed of the vehicle and a yaw rate of the vehicle, the first quantity not being determined as a function of the output of a transverse acceleration sensor;

comparing the first quantity with at least one characteristic value for the first quantity; and when the first quantity is at least equal to the at least one characteristic value, performing one of the steps of reducing a speed of the vehicle to and keeping the speed at a preselectable speed value by performing at least one of the steps of:

implementing brake measures on at least one wheel of the vehicle, implementing engine measures, and implementing retarder measures.

2. The method according to claim 1, wherein the at least one characteristic value corresponds to a threshold value.

3. The method according to claim 2, wherein the first quantity corresponds to a quantity describing a transverse acceleration of the vehicle.

4. The method according to claim 2, wherein the yaw rate of the vehicle is determined as a function of the speed of the vehicle and a steering angle of the vehicle.

5. The method according to claim 1, wherein at least one of the following conditions occurs:

the at least one characteristic value corresponds to one of a fixedly predetermined value and a value determined for a respective driving condition of the vehicle, and a value of the first quantity allowed for the vehicle without the vehicle becoming unstable on attaining the value of the first quantity is used as the at least one characteristic value.

6. The method according to claim 1, further comprising the step of:

determining the at least one characteristic value at least as a function of a wheel load of at least one wheel of the vehicle.

7. The method according to claim 6, wherein the wheel load is determined as a function of a contact force of a respective one of the at least one wheel.

8. The method according to claim 6, further comprising the steps of:

performing one of the steps of:

determining the at least one characteristic value as a function of a wheel load of at least one inside wheel during a turning operation, and determining a mass of the vehicle as a function of the wheel load of the at least one inside wheel, the at least one characteristic value being outputted from an engine characteristics map as a function of the mass of the vehicle.

9. The method according to claim 1, wherein the preselectable speed value is one of fixedly predetermined, determined at least as a function of at least one of the at least one characteristic value and the yaw rate of the vehicle, and determined using an engine characteristics map.

10. The method according to claim 1, further comprising the step of:

implementing at least one of the braking measures, the engine measures, and the retarder measures as long as the preselectable speed value is lower than the speed of the vehicle.

11. The method according to claim 1, further comprising the step of:

performing one of the steps of:

uniformly braking all wheels of the vehicle via appropriate braking measures, and braking all of the wheels of the vehicle via appropriate braking measures, involving at least one of the steps of:

braking at least a rear inside wheel during a turning operation less than the other wheels of the vehicle, not braking the rear inside wheel during the turning operation, and reducing a moment delivered by an engine via appropriate engine measures.

12. The method according to claim 1, further comprising the steps of:

reducing the at least one characteristic value by a small value;

comparing the first quantity with the reduced at least one characteristic value;

when the first quantity is greater than the reduced at least one characteristic value, reducing the speed of the vehicle to the preselectable speed value by performing at least one of the brake measures on at least one wheel of the vehicle, the engine measures, and the retarder measures.

13. A device for stabilizing a vehicle to prevent the vehicle from rolling over about a vehicle axis oriented in a longitudinal direction of the vehicle, the device comprising:

a comparing device for determining a quantity describing a transverse dynamic of the vehicle and comparing the quantity to at least one characteristic value for the quantity; the quantity being determined at least as a function of a speed of the vehicle and a yaw rate of the vehicle, the quantity not being determined as a function of the output of a transverse acceleration sensor; and a braking system for performing, when the quantity is at least equal to the at least one characteristic value, one of reduction of a speed of the vehicle to a preselectable speed value and a maintenance of the speed of the vehicle at the preselectable speed by at least one of braking measures on at least one wheel of the vehicle, engine measures, and retarder measures.

14. The device according to claim 13, wherein the at least one characteristic value corresponds to a threshold value.

15. The device according to claim 13, wherein the quantity describing the transverse dynamic of the vehicle corresponds to a quantity describing a transverse acceleration of the vehicle.

16. The device according to claim 13, wherein the yaw rate of the vehicle is determined as a function of the speed of the vehicle and a steering angle of the vehicle.

* * * * *